United States Patent Office 3,467,659
Patented Sept. 16, 1969

3,467,659
PROCESS FOR THE REDUCTION OF PYRIDINE N-OXIDES
Francis A. Daniher, Royal Oak, Mich., and Brennie E. Hackley, Jr., Joppa, Md., assignors to Ash Stevens, Inc., Detroit, Mich., a corporation of Michigan
No Drawing. Filed Sept. 14, 1966, Ser. No. 579,196
Int. Cl. C07d 31/02, 39/00
U.S. Cl. 260—290                    10 Claims

ABSTRACT OF THE DISCLOSURE

Pyridine N-oxide can be reduced to pyridine by reaction of the oxide with sulfur dioxide at elevated temperatures in water or a substantially water-miscible polar solvent, followed by addition of sufficient base to liberate the reduced pyridine as its free base. The process is also used to reduce substituted pyridine N-oxides to the correspondingly substituted pyridine compounds. Because pyridine N-oxides are more susceptible than pyridine to aromatic substitution reactions, it is useful to produce substituted pyridine compounds by carrying out the substitution reaction on pyridine N-oxide followed by reduction of the N-oxide by this process.

---

This invention relates to a process for the reduction of pyridine N-oxide as well as a large variety of substituted pyridine N-oxides to the corresponding pyridine and substituted pyridines. The process of the present invention is particularly useful for the reduction of substituted pyridine N-oxides. More specifically this invention concerns a process for the reduction of these pyridine N-oxides using sulfur dioxide at elevated temperatures in solutions of these pyridine N-oxides in water and/or substantially water-miscible, polar solvents.

Pyridine has greater stability and is less susceptible to the usual aromatic substitution reactions than is benzene (Fieser and Fieser, Organic Chemistry, 3rd ed., New York, Reinhold, 1956, pp. 806–809). It is stated in this reference that pyridine corresponds more closely to nitrobenzene than it does to benzene in its degree of reactivity in the usual aromatic substitution reactions. These authors find an explanation for this property in terms of the resonance theory. Thus, substituted pyridines have been difficult to produce by use of the usual aromatic substitution reactions.

Ochiai (J. Org. Chem., 18, 534–51, 1953) found that pyridine N-oxide and substituted pyridine N-oxides are more susceptible to the usual aromatic substitution reactions than is pyridine. Synthetic manipulations on the pyridine nucleus are facilitated by oxidizing the pyridine compound to the corresponding pyridine N-oxide, carrying out the desired substitution reaction, and reducing the pyridine N-oxide to produce the substituted pyridine. An essential step is the reduction of the pyridine N-oxide to the free pyridine compound.

There are several known processes for reducing tertiary aliphatic oxides to the tertiary amines. Reduction by aqueous sulfurous acid and by acidic solutions of alkali metal iodides are examples. However, as stated by Ochiai (J. Org. Chem., 18, 534–51, 1953), pyridine N-oxides are remarkably resistant to reduction and are not reduced by many of the processes employed successfully for the reduction of tertiary aliphatic amine oxides. Ochiai has attributed this charateristic to the resonance effect within the pyridine ring.

Ochiai found that some pyridine N-oxides can be reduced to the corresponding pyridine compound by reaction of the pyridine N-oxide with phosphorus trichloride in chloroform. This process suffers from the disadvantage that other groups present in the molecules are often of a nature such as to be attacked also by the phosphorus trichloride. The use of this reduction process has a serious limitation in that it cannot be used with a large variety of substituents attached to the pyridine ring.

Relyea and coworkers (J. Org. Chem., 27, 477, 1962) have reported that pyridine N-oxides can be reduced by reaction with elemental sulfur at 130°–140° C. This process has the disadvantage that sulfur reacts also with alkyl groups attached to the pyridine nucleus. For example, reaction of sulfur with 4-picoline N-oxide produced not only 4-picoline but also a pyridylthiophene, a known product of the reaction of 4-picoline with sulfur (U.S. Patent 2,515,233). Another disadvantage of this procedure is that the rate of reaction is often difficult to control, since it was found in at least one instance that heating of a mixture of the oxide and sulfur resulted in a violent, explosive reaction. Thus, the usefulness of this process has serious limitations.

It is an object of this invention to provide a process for reducing unsubstituted and substituted pyridine N-oxides which can be used particularly with substituted pyridine N-oxides having a larger variety of substituents than with processes described in the prior art. It is another object of this invention to provide a reduction process which is economical, easily controlled, and conveniently employed on either a small or large scale. Other objects may become apparent as this invention is disclosed.

The present invention relates to the process for the reduction of the N-oxide group of unsubstituted and substituted pyridine N-oxides, whose N-attached oxygen has an electron density greater than that of N-attached oxygens of pyridine N-oxides having an electron-withdrawing, meta-directing group in the 4-position, to the corresponding pyridines which comprises reacting sulfur dioxide with a solution of the pyridine N-oxide in a solvent selected from the group consisting of water and substantially water-miscible, polar solvents at elevated temperatures, providing sufficient base to the product of the reaction of the pyridine N-oxide and sulfur dioxide to form the reduced pyridine compound, and separating the reduced pyridine compound from the reaction product mixture.

Sulfur dioxide and aqueous solutions of sulfur dioxide (sulfurous acid) are often used for the reduction of tertiary aliphatic amine oxides. A process employing these reducing agents for the reduction of substituted pyridine N-oxides would be advantageous in that these reagents do not readily attack a large variety of organic functional groups. These reagents are economical and conveniently used. However, Relyea and coworkers, in the reference cited hereinbefore, and Johnson and coworkers (J. Chem. Soc., 1958, 3230) have concluded that sulfur dioxide does not reduce pyridine N-oxides.

It has been discovered that sulfur dioxide does reduce pyridine N-oxide and substituted pyridine N-oxides when the above reaction conditions are used. Furthermore, it has been discovered that the reduction can be carried out conveniently, with good control of the reaction and without a deleterious effect on a large variety of substituents attached to the pyridine nucleus.

The process of the present invention is believed to proceed by the following reactions:

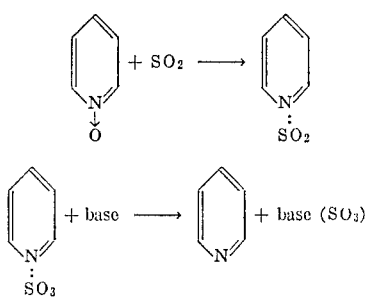

Reaction I is conducted in solution at elevated temperatures and is complete upon the addition of the sulfur dioxide. Reaction II is conducted on the reaction product of the sulfur dioxide and N-oxide to remove the sulfur trioxide group thereby forming the free pyridine compound which can be separated and purified by conventional means.

As can be seen from Reaction I at least an equimolar amount of sulfur dioxide to the pyridine N-oxide must be used in the reaction. In practice a two to three times molar excess of sulfur dioxide is used to insure the complete reaction of the pyridine N-oxide.

The solvent used is important. The dioxanes and lower molecular weight alcohols having one to eight carbon atoms are examples of substantially water-miscible, polar solvents which are used in practicing this invention. Ethanol, propanol and isopropanol are examples of particularly useful lower molecular weight alcohols since they can be used in the preferred temperature range of about 70° C. to about 110° C. Walter and 1,4-dioxane are preferred solvents for practicing this invention.

Sulfur dioxide is supplied to the reaction mixture by at least two methods. It is preferably supplied directly by bubbing sulfur dioxide gas into the reaction mixture continuously throughout the reaction period. Alternatively, sulfur dioxide is supplied by the addition of a salt of sulfurous acid to the reaction mixture.

It is commonly known that water soluble salts of sulfurous acid undergo ionic equilibrium reactions, particularly in the presence of water, to make sulfur dioxide available in usually small but finite quantities. Sodium hydrogen sulfite is a specific example of such a salt and examples are given in this specification wherein sodium hydrogen sulfite is used. However, other water soluble salts of sulfurous acid which undergo ionic equilibrium reactions to provide sulfur dioxide are useful in practicing this invention. The entire, necessary quantity of the salt can be added at the outset. Alternatively, smaller portions can be added from time to time or in a continuous manner throughout the reaction period.

The concentration of the pyridine N-oxide in the solvent is not critical, provided that the solubilities of reactants are not exceeded such as to prevent unreacted N-oxide from reacting with the sulfur dioxide. A concentration of between about 0.01 and 1.0 mole, preferably about 0.10 mole, of the N-oxide per one hundred milliliters of solvent is satisfactory, solubilities permitting.

The reaction is carried out in solution at elevated temperatures, preferably in the range of 70° to 110° C. The reaction is most preferably carried out at the reflux temperature of the reaction mixture. The use of refluxing conditions is convenient for maintaining the reaction mixture at an elevated temperature without the necessity of employing temperature-controlling devices. Furthermore, the boiling action assists in agitating and mixing the reaction mixture.

The following is a general description of the preferred process of the present invention when sulfur dioxide gas is used. The N-oxide is added to the chosen solvent and heated to its reflux temperature. Sulfur dioxide gas is bubbled slowly into the refluxing reaction mixture, preferably over a period of two to six hours. The rate of addition of the gas to the solution is not critical. A rapid rate is sometimes wasteful because some of the sulfur dioxide passes through and escapes from the solution without having reacted. A very slow rate is sometimes wasteful of time.

The procedure by which the product is produced from the reaction mixture differs slightly depending on the solvent used. When water is used as the solvent, the reaction product mixture is cooled to about room temperature and made basic in order to liberate the free pyridine. This is accomplished by the addition of an addition of an inorganic base such as an alkali metal hydroxide, an alkaline earth metal hydroxide or a salt of these metal ions and weak acids such as carbonate, bicarbonate and acetate. The base can be added as a solid or as an aqueous solution. The free pyridine compound is extracted with a suitable organic solvent from the water solution and the extracting solvent is distilled off. The crude pyridine compound can then be purified by distillation or recrystallization, as its properties dictate and by known processes.

When a water-miscible, polar organic solvent is used as the solvent for the reduction reaction, following completion of the reaction the solvent is preferably removed by distillation, preferably under reduced pressure. The residue is made basic by the addition of a water solution of an inorganic base. Alternatively, the residue is taken up in a small quantity of water and th mixture is made basic by the addition of an inorganic base. The basic water mixture is then worked up as hereinbefore described as when water is used as the reaction solvent.

When a salt of sulfurous acid is employed as the source of sulfur dioxide an aqueous medium as usually used. The salt and the pyridine N-oxide to be reduced are mixed together in the aqueous medium and the mixture is heated at elevated temperatures, preferably at its reflux temperature for several hours. Mechanical stirring can be used and is particularly useful in those instances where the reactants do not dissolve completely in the volume used of the aqueous medium. An excess of the salt of sulfurous acid is used, two times molar requirements being preferred, but more or less excess can be used, depending partly on the ease of reduction of the particular pyridine N-oxide being reduced. When the preferred concentrations of pyridine N-oxide are used, the reaction mixture is maintained at its reflux temperature for about six hours, however, the length of time depends partly upon the ease of reduction and the concentration of the pyridine N-oxide being reduced. The product is produced from the reaction mixture in the same manner as described above when sulfur dioxide gas is added as the reducing agent to the water solution.

The following Examples I to XXIII will show in further detail the operation of this invention.

EXAMPLE I

A slow stream of sulfur dioxide was introduced into a refluxing solution of 9.5 grams (0.10 mole) of pyridine N-oxide in one hundred milliliters of 1,4-dioxane for three hours. The solution was cooled to about room temperature and the solvent was removed by distillation under the reduced pressure provided by an efficient water aspirator. The residue was made alkaline by the addition of 20% solution of potassium carbonate in water. The alkaline mixture was extracted with diethyl ether and the combined extracts were dried over anhydrous potassium carbonate, filtered and evaporated to leave the crude product. The crude product was distilled to obtain a 66% yield of pyridine boiling at 114° C. The picric acid salt melted at 166°–167° C.

Table I summarizes the results of Example I and of the reduction or, in certain instances, as explained hereinafter, attempted reduction of a large variety of substituted pyridine N-oxides in Examples II–XIV by the addition of sulfur dioxide gas to a solution of the N-oxide in refluxing 1,4-dioxane. The reaction conditions and procedure were used as described in Example I, with two exceptions as to the reaction time as are noted in Table I. In the table are recorded the identity of the substituted pyridine N-oxide, the yield and boiling point or melting point of the reduced product, and the melting point of the picric acid salt of the reduced product.

3-chloropyridine N-oxide used in Example IV was prepared by the process described by M. P. Cava and B. Weinstein, J. Org. Chem., 23, 1616 (1958). 2-methyl-4-methoxypyridine N-oxide used in Example V was prepared by the process described by E. Ochiai and I. Suzuki, J. Pharm. Soc. Japan, 67, 158 (1947). 2-methyl-6-acetamidopyridine N-oxide used in Example VII was prepared by the process described by R. Adams and S. Miyano, J. Am. Chem. Soc., 76, 2785 (1954). 2-methyl-4-chloropyridine N-oxide used in Example VIII was prepared by the process described by E. Profft and W. Rolle, Miss. Z. Tech. Hochsch. Chem. Leuna-Nersburg, 2, 187 (1959–60); Chem. Abstra., 55, 16091 (1961). 2,5-dimethylpyridine N-oxide used in Example X was prepared by the process described by Y. Oratia and K. Ochiwa, Yakugaku Zasshi, 79, 108 (1959); Chem. Abstr., 53, 10211 (1959). 2-methyl-5-ethylpyridine N-oxide used in Example XI was prepared by the process described by J. A. Berson and T. Cohen, J. Am. Chem. Soc., 78, 416 (1956). 2-methyl-4-nitropyridine N-oxide used in Example XIII was prepared by the process described by E. Ochiai, K. Arima and M. Ishikawa, J. Pharm. Soc. Japan, 63, 79 (1943). 4-carbomethoxypyridine N-oxide used in Example XIV was prepared by the process described by R. L. Bixler and C. Niemann, J. Am. Chem. Soc., 80, 2716 (1958). The substituted pyridine N-oxides used in other examples in Table I are known to the prior art.

Reduction of five substituted pyridine N-oxides was conducted by adding sulfur dioxide gas for three hours to a refluxing solution of the N-oxide in water. One-tenth mole of the N-oxide was dissolved in one hundred milliliters of water. Over a three-hour period, and while maintaining the solution at its reflux temperature, sulfur dioxide gas was slowly introduced into the solution. The solution was cooled to about room temperature and made alkaline by the addition of solid potassium carbonate. The product was extracted with diethyl ether, the extracts dried over anhydrous potassium carbonate and evaporated. The crude product was purified further by distillation and a portion used for preparation of its picric acid salt. In every case the product was the same as that obtained when the reduction was carried out in 1,4-dioxane. The N-oxides employed and the results of Examples XV–XIX are summarized in Table II.

TABLE I.—REDUCTIONS WITH SULFUR DIOXIDE IN 1,4-DIOXANE

| Example | Pyridine N-oxide | Yield | Product Boiling point (° C.) | Picrate melting point (° C.) |
|---|---|---|---|---|
| I | Unsubstituted | 66 | 114 | 166–7 |
| II | 2-methyl | 34 | 126–7 | 166–7 |
| III | 4-methyl | 31 | 141–2 | 165–6 |
| IV | 3-chloro | 21 | 54/20 mm. | 138–9 |
| V | 2-methyl-4-methoxy | 62 | 89/15 mm. | 146–7 |
| VI | 2-methyl-5-carboethoxy [1] | 68 | 67/0-5 mm. | 167–8 |
| VII | 2-methyl-6-acetamido | 65 | [3] 88–9 | |
| VIII | 2-methyl-4-chloro | 41 | 61/19 mm. | 176–7 |
| IX | 2,6-dimethyl | 67 | 142–3 | 167–8 |
| X | 2,5-dimethyl | 65 | 55/17 mm. | 167–9 |
| XI | 2-methyl-5-ethyl | 63 | 72/19 mm. | 166–8 |
| XII | 2,6-dimethyl-3-nitro [2] | 31 | [3] 36–8 | |
| XIII | 2-methyl-4-nitro | [4] | | |
| XIV | 4-carbomethoxy | [4] | | |

[1] Four hours reflux.
[2] Six hours reflux.
[3] Melting point.
[4] No reaction.

TABLE II.—REDUCTIONS WITH SULFUR DIOXIDE IN WATER

| | Pyridine N-oxide | Yield, percent |
|---|---|---|
| Example: | | |
| XV | 2-methyl-5-carboethoxy | 54 |
| XVI | 2-methyl-4-chloro | 38 |
| XVII | 2,6-dimethyl | 78 |
| XVIII | 2-methyl-5-ethyl | 74 |
| XIX | 2-methyl-4-nitro | (1) |

[1] No reaction.

Examples XX–XXIII shown in Table III illustrate the operation of this invention when sodium hydrogen sulfite is used as the source of sulfur dixoide. In Examples XX–XXIII, 2-methyl-5-ethylpyridine N-oxide, 2-methyl-4-methoxypyridine N-oxide, 2-methyl-5-carboethoxypyridine N-oxide, and 2-methyl-6-acetamidopyridine N-oxide were reduced. A solution of 0.10 mole of the pyridine N-oxide and 0.20 mole of sodium hydrogen sulfite in one hundred milliliters of water was refluxed for six hours. The solution was allowed to cool to about room temperature and made alkaline by the addition of solid potassium carbonate. The product was extracted with diethyl ether from the alkaline solution and the ether extracts were dried over anhydrous potassium carbonate and evaporated to leave the crude product. The product was purified by distillation or, in the case of the 2-methyl-6-acetamido compound, by recrystallization. The products were identical to those obtained by reduction of these N-oxides by sulfur dioxide in 1,4-dioxane.

TABLE III

| | Pyridine N-oxide | Yield, percent |
|---|---|---|
| Example: | | |
| XX | 2-methyl-5-ethyl | 66 |
| XXI | 2-methyl-4-methoxy | 44 |
| XXII | 2-methyl-5-carboethoxy | 19 |
| XXIII | 2-methyl-6-acetamido | 27 |

It can be seen from the results summarized in the tables that, notwithstanding statements to the contrary in the prior art, pyridine N-oxide and a large variety of substituted pyridine N-oxides are reduced by sulfur dioxide. It is apparent, however, that certain selected substituted pyridine N-oxides are not reduced by the process of this invention. Those substituted pyridine N-oxides which do not undergo reduction by this process have the common characteristic of having an electron-withdrawing, meta-directing group in the 4-position.

As stated hereinbefore, the resonance theory is helpful in explaining the peculiar reactivity of pyridine and pyridine N-oxide. The resonance theory provides an explanation for the observed low reactivity of pyridine in the usual aromatic substitution reactions. Ochiai has related the general resistance of pyridine N-oxide and substituted pyridine N-oxides to reduction to the resonance effect within the pyridine ring. The peculiar resistance of 2-methyl-4-nitropyridine N-oxide and 4-carbomethoxypyridine N-oxide, Example XIII, XIV, and XIX, to reduction by the process of this invention also finds an explanation in terms of the resonance theory. The nitro group and the carbomethoxy group found in the 4-position in these examples are known to be electron-withdrawing, meta-directing groups when attached to the benzene ring (Fieser and Fieser, Organic Chemistry, 3rd ed., New York Reinhold, 1956, p. 557). In terms of the resonance theory, the effect of the presence of electron-withdrawing, meta-directing groups such as these in the 4-position of pyridine N-oxides is a diminishing of the electron density about the oxygen atom of the N-oxide. If successful reduction by sulfur dioxide proceeds by initial attack by sulfur dioxide on the normally electron-rich oxygen atom of the N-oxide, it is not surprising that an N-oxide, the electron density of whose oxygen atom is diminished by the presence of an electron-withdrawing, meta-directing group in the 4-position, is not reduced by sulfur dioxide.

The following functional groups are examples of electron-withdrawing, meta-directing groups (Fieser and Fieser, Organic Chemistry, 3rd ed., New York, Reinhold, 1956, p. 557); quaternary ammonium, $—N^+(CH_3)_3$; nitro, $—NO_2$; nitrile $—CN$; sulfonic acid, $—SO_3H$; aldehyde, $—CHO$; ketone, $—C(O)CH_3$; carboxylic acid, $—CO_2H$; ester, $—CO_2CH_3$; amide, $—CONH_2$; amine salt, $—N^+H_3$. They are listed in descending order of effectiveness as electron-withdrawing, meta-directing groups. Pyridine N-oxides having one of these groups in the 4-position are those selected substituted pyridine N-oxides which are not reduced by the process of this invention.

A description of this invention and examples of its operation having been given, various modifications will be apparent to those skilled in the art and are considered to be within the scope of the invention, its scope being limited only as in the appended claims.

We claim:
1. The process for the reduction of the N-oxide group of unsubstituted and substituted pyridine N-oxides, whose N-attached oxygen has an electron density greater than that of N-attached oxygen of pyridine N-oxides having an electron-withdrawing and meta-directing group in the 4-position, to the corresponding pyridines which consists essentially of:
  (a) reacting sulfur dioxide with a liquid solution of the pyridine N-oxide dissolved in a solvent selected from the group consisting of water and substantially water-miscible, polar solvents at elevated temperatures up to the reflux temperature of the solution to form a reaction product containing a N-sulfur trioxide group;
  (b) adding a sufficient amount of an inorganic base to the product of the reaction of the pyridine N-oxide and sulfur dioxide which removes the sulfur trioxide group to form the reduced pyridine compound; and
  (c) separating the reduced pyridine compound from the reaction product mixture.

2. The process of claim 1 wherein the sulfur dioxide is supplied to said solution by the addition of sulfur dioxide gas to said solution.

3. The process of claim 1 wherein the solvent is selected from the group consisting of water and 1,4-dioxane.

4. The process of claim 3 wherein the sulfur dioxide is supplied to said solution by the addition of sulfur dioxide gas to said solution.

5. The process of claim 1 wherein the solvent is water and the sulfur dioxide is supplied to said solution by the addition of sodium hydrogen sulfite to said solution.

6. The process of claim 1 wherein the solvent is selected from the group consisting of water and 1,4-dioxane and wherein the elevated temperature is between about 70° C. to the reflux temperature of the solution.

7. The process of claim 1 wherein the concentration of the pyridine N-oxide in solution is between about 0.01 to 1.0 mole per 100 milliliters of solvent.

8. The process of claim 1 wherein the reaction temperature is at least about 70° C. to about 110° C.

9. The process of claim 1 wherein a molar excess of sulfur dioxide with respect to the pyridine N-oxide is used.

10. The process of claim 1 wherein a 2 to 3 times molar excess of sulfur dioxide with respect to the pyridine N-oxide is used.

No references cited.

HENRY R. JILES, Primary Examiner

C. M. SHURKO, Assistant Examiner

U.S. Cl. X.R.
260—295, 297

UNITED STATES PATENT OFFICE
CERTIFICATE OF CORRECTION tent No. 3,467,659 September 16, 1969

Francis A. Daniher et al.

It is certified that error appears in the above identified patent and that said Letters Patent are hereby corrected as shown below:

In the heading to the printed specification, lines 5 and 6, " ssignor to Ash Stevens, Inc., Detroit, Mich., a corporation of :higan" should read -- said Daniher assignor to Ash Stevens, :., Detroit, Mich., a corporation of Michigan; said Hackley signor to the United States of America as represented by the :retary of the Army --.

Signed and sealed this 4th day of August 1970.

AL)

est:

ard M. Fletcher, Jr.

WILLIAM E. SCHUYLER, JR.

sting Officer

Commissioner of Patents